United States Patent
Okrah

(10) Patent No.: US 6,594,550 B1
(45) Date of Patent: Jul. 15, 2003

(54) METHOD AND SYSTEM FOR USING A BUFFER TO TRACK ROBOTIC MOVEMENT

(75) Inventor: Angel Y. Okrah, Chandler, AZ (US)

(73) Assignee: ASM America, Inc., Pheonix, AZ (US)

( * ) Notice: Subject to any disclaimer, the term of this patent is extended or adjusted under 35 U.S.C. 154(b) by 0 days.

(21) Appl. No.: 10/113,197

(22) Filed: Mar. 29, 2002

(51) Int. Cl.$^7$ ............................................. G06F 19/00
(52) U.S. Cl. ..................... 700/245; 700/249; 700/260; 700/261; 700/262; 700/252; 318/563; 318/565; 318/567; 318/568.14; 318/568.2; 318/568.72; 901/9; 901/14; 901/19; 901/20
(58) Field of Search ................................. 700/245, 249, 700/260, 261, 252, 256, 82, 262; 318/565, 567, 568.14, 562, 563, 568.22, 568.2, 615; 901/14, 19, 23, 20, 9; 703/6, 22; 701/23

(56) References Cited

U.S. PATENT DOCUMENTS

| | | | | |
|---|---|---|---|---|
| 4,763,055 A | * | 8/1988 | Daggett et al. | 348/139 |
| 4,786,847 A | * | 11/1988 | Daggett et al. | 700/245 |
| 4,807,153 A | * | 2/1989 | Onaga et al. | 700/256 |
| 4,851,748 A | * | 7/1989 | Daggett et al. | 318/568.2 |
| 4,868,474 A | * | 9/1989 | Lancraft et al. | 318/568.2 |
| 4,908,556 A | * | 3/1990 | Daggett et al. | 318/568.2 |
| 5,600,759 A | | 2/1997 | Karakama | 700/252 |
| 5,675,229 A | | 10/1997 | Thorne | 318/568.11 |
| 6,173,246 B1 | * | 1/2001 | Billups, III | 703/22 |
| 6,175,206 B1 | | 1/2001 | Ueno et al. | 316/568.1 |

OTHER PUBLICATIONS

Ramadorai et al., A generic kinematics software package, 1994, IEEE, pp. 3331–3336.*
Silva et al., Instrumentation issues in the handling of fish for automated processing, 1992, IEEE, pp. 489–794.*

* cited by examiner

Primary Examiner—William A. Cuchlinski, Jr.
Assistant Examiner—McDieunel Marc
(74) Attorney, Agent, or Firm—Alexander B. Ching; Squire, Sanders & Dempsey L.L.P.

(57) ABSTRACT

A method for controlling movement of an automated machine. The movement is defined by a plurality of steps. First, a buffer of a predetermined size is defined. The buffer stores a current step and one or more previous steps in the movement of the automated machine. Then a current step in the movement of the automated machine is executed. Next, the buffer is checked to see if the current step executed in the movement of the automated machine movement is the same as a predetermined step of interest. If the current step is a predetermined step of interest, the buffer is checked to determine what at least one previous step was. If the current step was the step of interest, a new step is executed in the movement of the automated machine, the new step executed depending on what the at least one previous step was.

26 Claims, 3 Drawing Sheets

METHOD AND SYSTEM FOR USING A BUFFER TO TRACK ROBOTIC MOVEMENT

FIELD OF THE INVENTION

This invention relates to automated robotic software and more particularly to a method and system for using a buffer to track robotic movement.

BACKGROUND OF THE INVENTION

The use of robots in various manufacturing processes is becoming more common place. These robots typically perform repetitive tasks involving a series of different robotic movements. In current systems robots typically move sequentially through a plurality of states without any consideration of the movement steps made to reach the current state. That is, the next step executed by a robot depends at most on the immediate previous step. However, at certain time a robot may be in a state that can be reached via two or more sequence of steps. The knowledge of which sequence of steps was used to reach the current state can be used to determine future steps to take. Unfortunately, because the movement of robots in current systems depends entirely on the robot's current state, inefficient operations may take place.

For example, in a wafer handling machine a robot arm may automatically return to a center position after either a load carrier step or an unload carrier step. After a load carrier step the move to a center position is correct because after loading the cassette, individual wafers in the cassette will need to be counted in a map cassette step. However, after an unload cassette step, the next step that should be performed is most likely be a load cassette step. In that case, moving the robot arm to a center position is not needed and delays the loading of additional wafers. However, currently the movement of the robot arm to a center position is done after both the load step and the unload step because the robotic system moves through states without retaining knowledge of how the state was reached.

Thus a need has arisen for a method for using a buffer to track robotic movement.

SUMMARY OF THE INVENTION

Thus, a need has arisen for a method for tracking movement in a robotic system that overcomes drawbacks associated with other methods.

In one embodiment, a method for controlling the movement of an automated machine is disclosed. The movement is defined by a plurality of steps. First, a buffer of a predetermined size is defined. The buffer stores a current step and one or more previous steps in the movement of the automated machine. Then a current step in the movement of the automated machine is executed. Next, the buffer is checked to see if the current step executed in the movement of the automated machine movement is the same as a predetermined step of interest. If the current step is a predetermined step of interest, the buffer is checked to determine what at least one previous step was. If the current step was the step of interest, a new step is executed in the movement of the automated machine, the new step executed depending on what the at least one previous step was.

Technical benefits of the present invention include increased efficiency by correctly positioning a robot arm where it is needed for a next step based on one or more previous steps. Other technical benefits are apparent from the following descriptions, illustrations and claims.

BRIEF DESCRIPTION OF THE DRAWINGS

For a more complete understanding of the device and advantages thereof, reference is now made to the following descriptions in which like reference numerals represent like parts.

DETAILED DESCRIPTION OF THE DRAWINGS

Figure 1:
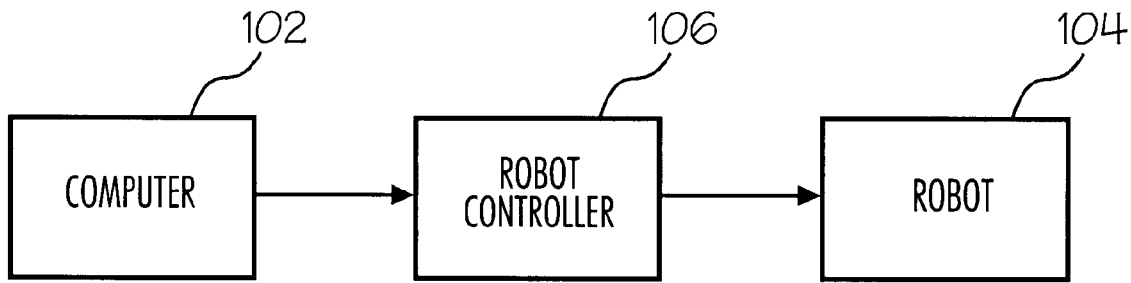
FIG. 1 is a block diagram of a computer controlled robotic system.

FIG. 1 is a block diagram of a computer controlled robotic system in accordance with the teachings of the present invention. The computer controlled system includes a computer 102 coupled to a robot controller 106, which is coupled to a robot 104.

Computer 102 can be any computing device such as a desktop computer, a laptop computer, or a dedicated processor such as an embedded processor. Computer 102 will include, as needed, a memory, a processor, mass storage, input/output connectivity, as is well known in the art. Typically computer 102 will be running a robot control program written in a programming language such as C++ or JAVA. The robot control program sends commands to the robot controller 106, which processes the commands to form signals that are sent to robot 104 to cause the robot 104 to undertake some sort of movement. In the present invention, the software running on computer 102 will allow for the state of the robot 104 to be based on one or more previous states.

Robot controller 106 acts as an interface between computer 102 and robot 104. Robot controller 106 can be any device that receives signals from computer 102, formulates control commands for robot 104 and sends those control commands to robot 104.

Robot 104 may be any type of robotic machine that undergoes a series of movements to complete an operation such as a robotic arm of robotic welder or a robot arm in a wafer handling machine.

Figure 2:
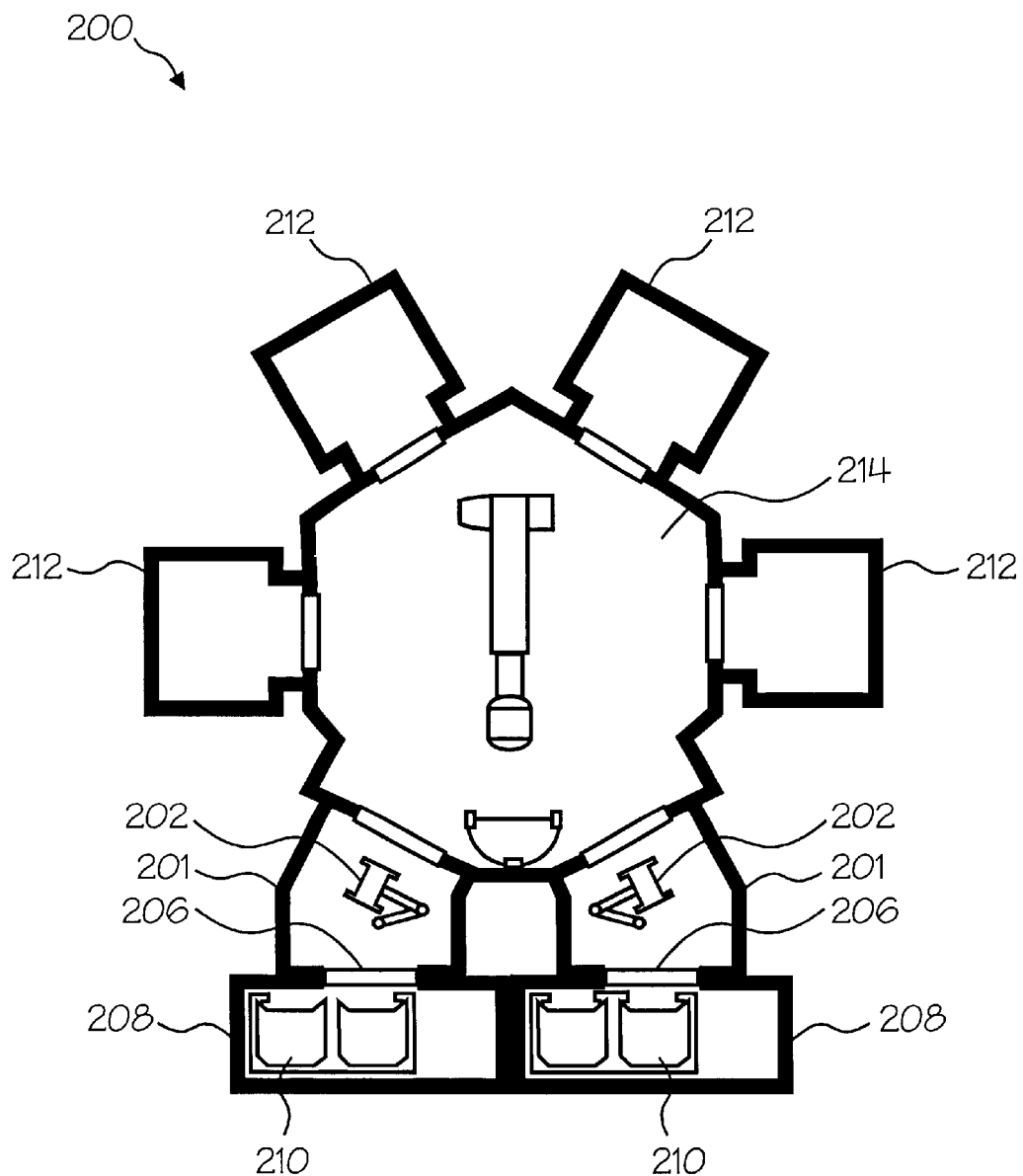
FIG. 2 is a schematic illustration of a robot arm used to load cassettes of wafers from a shuttle and into a load lock.

FIG. 2 is a schematic illustration of a robot arm used to load cassettes 210 of wafers from a shuttle 208 and into a load lock 201. Load lock 201 is part of a cluster tool 200 used to process semiconductor wafers. Cluster tool 200 is a semiconductor processing tool that includes a number of process stations 212 and loading stations (the load locks 201) coupled to a central wafer handling chamber 214. In this embodiment there is a right load lock and a left load lock. Each load lock 201 is used to transfer semiconductor wafers from a loading area to the wafer handling chamber 214 prior to processing in one of the processing stations 212. Each load lock 201 includes a robot arm 202 mounted within each load lock 201. Robot arm 202 is an example of the type of robot .104 that can be controlled in the present invention.

A shuttle 208 is placed near load lock 201. Shuttle 208 is used to hold one or more cassettes 210. Cassettes 210 contain a plurality of wafers (not pictured). A door 206 physically separates shuttle 208 from each load lock 201. Door 206 opens to allow robot arm 202 to extend past load lock 201 to remove or replace cassettes 210 of wafers on to shuttle 208.

In operation, robot arm 202 is used to load a cassette 210 with wafers to be processed and unload a cassette 210 that contains processed wafers. Initially, robot arm 202 is in a ready position. Then, a command is given to load a cassette 210 of wafers. This requires a number of movements where the position of the robot arm after each completed movement is called a state. Each movement is called a step. After the load command is given door 206 opens. Robot arm 202 then moves from the ready position to an extended position. Next robot arm 202 moves from the extended position to a position outside of door 206. Then robot arm 202 grasps a cassette 210 from the shuttle 208. Robot arm 202 then retracts to inside load lock 201. Robot arm 202 then moves to a center position. Once robot arm 202 is in the center position another device counts the number of wafers in cassette 210. Each of these movements, such as the robot arm 202 in the center position or the robot arm 202 retracted can be tracked as steps. In prior art systems these steps are performed over and over again without checking the current state against a predetermined step of interest and then have one or more prior steps checked to determined what the next step or steps should be. In the present invention each step can be checked to see if the system is in a certain state. If it is, previous steps can be examined to decide the next step to execute.

Besides the command to load cassettes, a command can be given to unload cassettes 210 of wafers from load lock 201 to shuttle 208. Prior to issuing this command, cassettes 210 would contain processed wafers. The command to unload a cassette 210 would first cause the door 206 to open. Robot arm 202 would then extend to outside load lock 201. Next, the robot arm 202 deposits cassette 210 on to shuttle 208. After robot arm 202 deposits the cassette 210 on the shuttle, robot arm 202 retracts in to the load lock 201.

It is at this point in the system where prior art static systems have their drawbacks. Once the robot arm 202 retracts it would typically move to a center position. But, in order to increase efficiencies, after an unload cassette command is given it is better to immediately load another cassette 210 of wafers into load lock 201 instead of moving robot arm 202 to a central position. But in a static system when the robot arm 202 is in the retracted state, the system does not know if this state was reached from a load command or unload command. In the present invention, a memory buffer can be utilized such that once robot arm 202 is in the retracted position other previous steps can be checked to see if the retracted position was reached from an unload command or a load command in order to determine the next step to execute.

Figure 3:
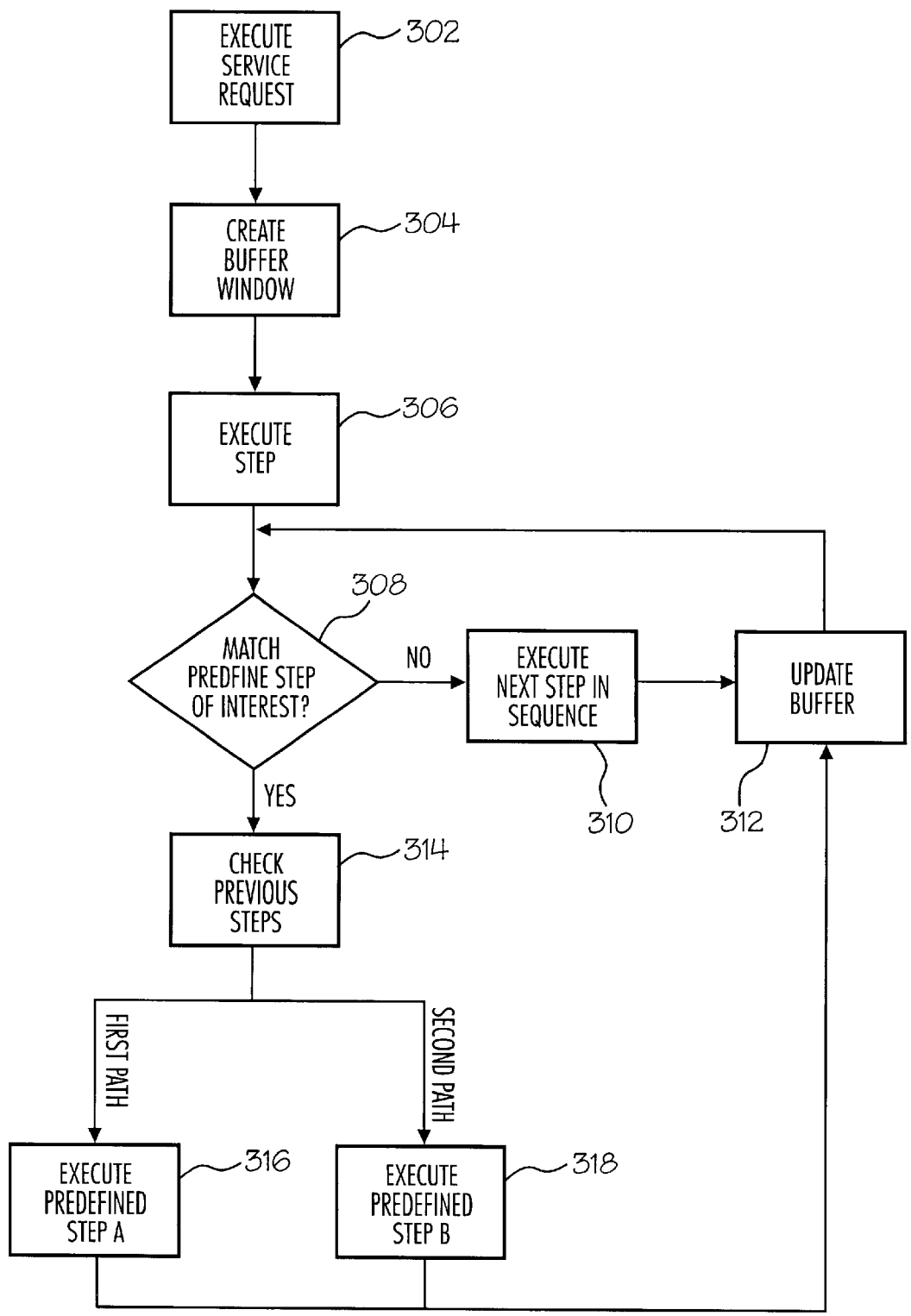
FIG. 3 is a flowchart illustrating an operation of an embodiment of the present invention.

FIG. 3 is a flowchart illustrating an operation of an embodiment of the present invention. In step 302, a service request is executed. In the embodiment of FIG. 2, the service request is a request such as "load wafer" or "unload wafer". The service request will initiate a series of steps to be performed by robot arm 202. The result of each step can be represented as a discrete state.

In step 304, a buffer or window of N elements is created. A one-dimensional variable, W(N) stores each of the last N steps of the robots movements.

In step 306, a robot movement step, generally denoted as SM_A, is executed. The robot movement step is stored in the first buffer entry, W(1).

In step 308, the robot movement step that has just been executed is checked to see if it is a step of concern. A step of concern is a step that, when reached, requires a check of previous steps to see what should be the next step taken. A step of concern is typically predefined in the computer code running the robot.

If the current robot movement step is not the step of concern, in step 310 the next robot movement step is executed. In step 312 the buffer is updated. The last robot movement step executed is stored in the first buffer or window position, W(1). The other previous robot movement steps are stored in a buffer or window position, one index number higher. Since only the last N steps can be stored, the N+1 step is discarded. For example if steps A, B, C and D have been executed and the window buffer stores five steps (N=5) then the window buffer would contain:

W(5)="0"
W(4)="A"
W(3)="B"
W(2)="C"
W(1)="D"
After a fifth step, E, is executed the buffer will be:
W(5)="A"
W(4)="B"
W(3)="C"
W(2)="D"
W(1)="E"
After a sixth step, F, is executed the buffer will be
W(5)="B"
W(4)="C"
W(3)="D"
W(2)="E"
W(1)="F"
Note that step A is removed from the window buffer because the window buffer example only holds five steps.
So generally, when a new step, NEW STEP, is executed, the buffer is updated as follows:
W(n)=w(n−1)
W(n−1)=w(n−2)
W(n−2)=w(n−3)
W(1)=NEW STEP Thus, the buffer acts as a first in, first out buffer of after the buffer is updated in step 312, the process continues at step 308. While the buffer or window is illustrated as a first in, first out buffer, other buffers or windows can be used as is well known in the art.

If, at step 308, it is determined that the current robot movement step is the step of concern, then in step 314 further checks are optionally made to determine how the current robot movement step was reached. This is done by checking the buffer or window back a number of previous steps to see how the current robot movement step was reached. If the current step was reached via one set of previous steps then a new sequence of steps is executed at step 316. This would be followed by an update of the buffer in step 312 and a continuation of the process in step 308.

If, instead, the current robot movement step was reached via a different set of previous states then, in step 318, a different sequence of steps than those in step 316 is executed. This again will be followed by an update of the buffer in step 312 and a continuation of the process in step 308. While FIG. 3 illustrates two potential paths leading to different sequences of robot movement steps, additional new sequences of robot movement steps could be reached depending on the previous steps. Typically, the number of steps to check the buffer for and the identity of the previous steps that determines the future steps is predetermined and is in the code of the robot control program.

For example, consider a first sequence of steps, "A"; "B"; "C"; "D"; "E"; "F"; and a second sequence of steps "G"; "H"; "I"; "J";I "K"; and "F". Assuming "F" is the step of concern, when that step is reached, step 308 would evaluate to a yes. Then in step 314, a predetermined number of previous steps stored in the buffer will be checked to see what those steps were. If the number of previous steps to check back was one step, then the W(2) entry of the buffer would be checked. In the case of the first sequence W(2)= "D". For the second sequence W(2)="J". One set of steps to be executed based on the W(2) being equal to "D" might then be executed for the first sequence while a different series of steps to be executed might then be executed based on W(2) being equal to "J".

Having now described preferred embodiments of the invention modifications and variations may occur to those skilled in the art. The invention is thus not limited to the preferred embodiments, but is instead set forth in the following clauses and legal equivalents thereof.

What is claimed is:

1. A method for controlling movement of an automated machine, the movement defined by a plurality of steps, the method comprising:

defining a buffer of a predetermined size, the buffer storing a current step and one or more previous steps in the movement of the automated machine;

executing a current step in the movement of the automated machine;

checking to see if the current step executed in the movement of the automated machine movement is the same as a predetermined step of interest;

if the step is the predetermined step of interest, checking the buffer to determine what at least one previous step was; and if the step is the predetermined step of interest, executing a new step in the movement of the automated machine, the new step executed depending on what the at least one previous step was.

2. The method of claim 1 wherein the step of defining a buffer of predetermined size further comprises defining a first in, first out buffer.

3. The method of claim 1 wherein the step of executing a new step further comprises executing either a first sequence of new steps or a second sequence of new steps depending on what the at least one previous step was.

4. The method of claim 1 wherein the step of executing a step further comprises executing a step in the movement of a robot arm in a load lock of a cluster tool.

5. The method of claim 1 further comprising executing a next step in an original sequence of steps and updating the buffer if the current step is not the predetermined step of interest.

6. A system for controlling an automated machine comprising;

a controller coupled to the automated machine, the controller receiving movement commands as a plurality of steps that place the automated machine into one of a plurality of states;

a control computer coupled to the controller, the computer having a memory and a processor, the computer comprising:

a buffer residing in the memory, the buffer storing a current step executed in the movement of the automated machine and a predetermined number of previous steps; and an automated control program running in conjunction with the processor, the automated control program operable to determine a next step to be executed from a choice of more than one step, based on the identity of a previous step and send the next step to the controller as a next movement command.

7. The system of claim 6 wherein the automated control program checks the current step executed to determine if the current step matches a predetermined step of interest.

8. The system of claim 7 wherein the automated control program chooses between two or more predetermined sequences of steps depending on identity of a previous step after the current step is determined to match the predetermined step of interest.

9. The system of claim 6 wherein the automated machine is a robot arm in a semiconductor processing tool.

10. The system of claim 6 wherein the buffer is a first in, first out buffer.

11. A method for controlling movement of a robot arm in a semiconductor processing tool comprising:

defining a buffer of a predetermined size, the buffer storing the previous steps in the movement of the robot arm;

executing a step in the movement of the robot arm;

checking to see if the step executed in the movement of the robot arm is the same as a predetermined step of interest;

checking the buffer to determine what at least one previous step was, if the step is the predetermined step of interest; and executing a new step in the movement of the robot arm, if the step is the predetermined step of interest, the new step executed depending on what the at least one previous step was.

12. The method of claim 11 wherein the step of defining a buffer of predetermined size further comprises defining a first in, first out buffer.

13. The method of claim 11 wherein the step of executing a new step further comprises executing either a first sequence of new steps or a second sequence of new steps depending on what the at least one previous step was.

14. The method of claim 11 further comprising executing a next step in an original sequence of steps and updating the buffer if the current step is not the predetermined step of interest.

15. The action of claim 11 wherein the robot arm is in a cluster tool.

16. A system for controlling a robot arm in a semiconductor processing tool comprising:

a robot controller coupled to the robot arm, the robot controller receiving movement commands as a plurality of steps that place the robot arm into one of a plurality of states; and a control computer coupled to the robot controller, the control computer having a memory and a processor, the control computer comprising:

a buffer residing in the memory, the buffer storing the current step executed in the movement of the robot arm and a predetermined number of previous steps; and a robot control program running in conjunction with the processor, the robot control program operable to determine the next step to be executed from a choice of more than one step based on the identity of a previous step.

17. The system of claim 16 wherein the robot control program checks the current step executed to determine if the current step matches a predetermined step of interest.

18. The system of claim 17 wherein the robot control program chooses between two or more predetermined sequences of steps depending on identity of a previous step after the current step is determined to match the predetermined step of interest.

19. The system of claim 16 wherein the buffer is a first in, first out buffer.

20. The system of claim 16 wherein the robot arm is used to transport wafers to a cluster tool.

21. A control computer for controlling movement of an automated machine, the control computer having a memory and a processor, the control computer comprising:

a buffer residing in the memory, the buffer storing current step executed in the movement of the automated machine and a predetermined number of previous steps;

an automated control program running in conjunction with a processor, the automated control program operable to:

formulate a signal indicative of the current step in the movement of the automated machine;

send the signal to a robot controller;

check the current step against one or more previous steps stored in the buffer; and determine a next step based on identity of one or more previous steps.

22. The control computer of claim 21 wherein the current step is checked to see if the current step is a step of interest prior to checking the step against one or more previous steps.

23. The control computer of claim 21 wherein the buffer is a first, in first out buffer.

24. The control computer of claim 21 wherein the automated control program checks the current step against one or more previous steps if the current step matches a step of interest.

25. A computer readable medium employing a software program for controlling movement of an automated machine, the software program comprising:

program code configured to form a buffer, the buffer storing a current step executed in the movement of the automated machine and a predetermined number of previous steps;

program code configured to determine if a current step is a step of interest;

program code configured to access the buffer and determine identity of at least one previous step, if the current step is the step of interest; and program code configured to determine a next step to be executed from a choice of more than one step, based on the identity of the at least one previous step, if the current step is the step of interest.

26. The software program of claim 25 wherein the program code is configured to execute a next step in an original sequence of steps and update the buffer if the current step is not the predetermined step of interest.

* * * * *